June 4, 1957 H. G. GENTRY 2,794,374
MACHINE FOR FEEDING COLLAPSED BOTTLE CARTONS
Filed Dec. 21, 1953 9 Sheets—Sheet 2

INVENTOR.
HERMOND G. GENTRY
BY
Parrott & Richards
ATTORNEYS

June 4, 1957  H. G. GENTRY  2,794,374
MACHINE FOR FEEDING COLLAPSED BOTTLE CARTONS
Filed Dec. 21, 1953  9 Sheets-Sheet 7

Fig. 11

INVENTOR.
HERMOND G. GENTRY
BY
Parrott & Richards
ATTORNEYS

June 4, 1957  H. G. GENTRY  2,794,374
MACHINE FOR FEEDING COLLAPSED BOTTLE CARTONS
Filed Dec. 21, 1953  9 Sheets-Sheet 8

INVENTOR.
HERMOND G. GENTRY
BY
Parrott & Richards
ATTORNEYS

United States Patent Office 2,794,374
Patented June 4, 1957

2,794,374

MACHINE FOR FEEDING COLLAPSED BOTTLE CARTONS

Hermond G. Gentry, Atlanta, Ga., assignor to Atlanta Paper Company, a corporation of Georgia Application December 21, 1953, Serial No. 399,337

5 Claims. (Cl. 93—53)

This invention relates in general to carton set up machines, and more particularly to a machine of this sort for setting up collapsible bottle cartons as disclosed in copending application Serial No. 373,476, filed August 11, 1953, for which several advantageous improvements are provided by the present invention.

The machine disclosed in the above noted copending application operates to set up collapsible bottle cartons automatically in preparation for loading the cartons with bottles. Generally described, this machine comprises a hopper structure arranged to contain a stacked supply of the collapsed bottle cartons to be set up together with means, including a pair of feed rolls, for feeding the cartons in collapsed form from the hopper structure to a set-up station, means at the set-up station for setting up the collapsed cartons in position to be discharged by the next succeeding carton feed thereto, guide means for receiving the discharged cartons after setting up, and means for operating the setting up means cyclicly in timed relation to the feeding means.

According to the present invention an improved gate arrangement is provided in the hopper structure for facilitating the feeding of collapsed bottle cartons therefrom, and which arrangement also provides for mounting one of the feed rolls yieldably for improved feeding action. In addition, an adjustable arrangement of the setting up means is provided to allow different settings thereof for different sizes of bottle cartons, and an improved drive means and operating control therefor is further provided for actuating the setting up means in relation to the feeding means.

These improvements and other features of the present invention are described in detail below in connection with the accompanying drawings, in which.

Figure 1:
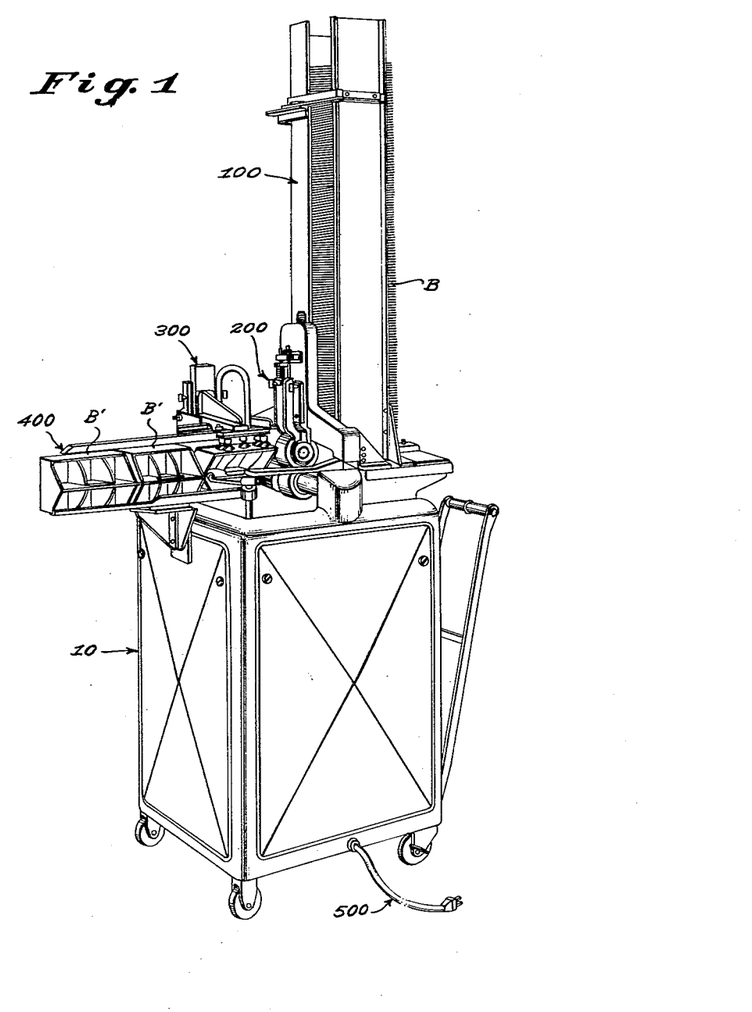
Fig. 1 is a perspective view of a machine for setting up bottle cartons arranged in accordance with the present invention.

The embodiment of the present invention shown in the drawings comprises a machine that is generally similar to the one disclosed in the above noted copending application, and in which (as seen in Fig. 1) the supporting frame structure is designated generally by the reference numeral 10; the hopper structure, for containing a stacked supply of collapsed bottle cartons B to be set up, by the reference numeral 100; the feed means, for feeding the collapsed cartons B to the set-up station, by the reference numeral 200; the setting up means at the set-up station by the reference numeral 300; the discharge guide means, for receiving the erected cartons B' from the set-up station, by the reference numeral 400; and the electrical circuit connection, for controlling operation of the machine, by the reference numeral 500.

Figures 2, 3, 4:
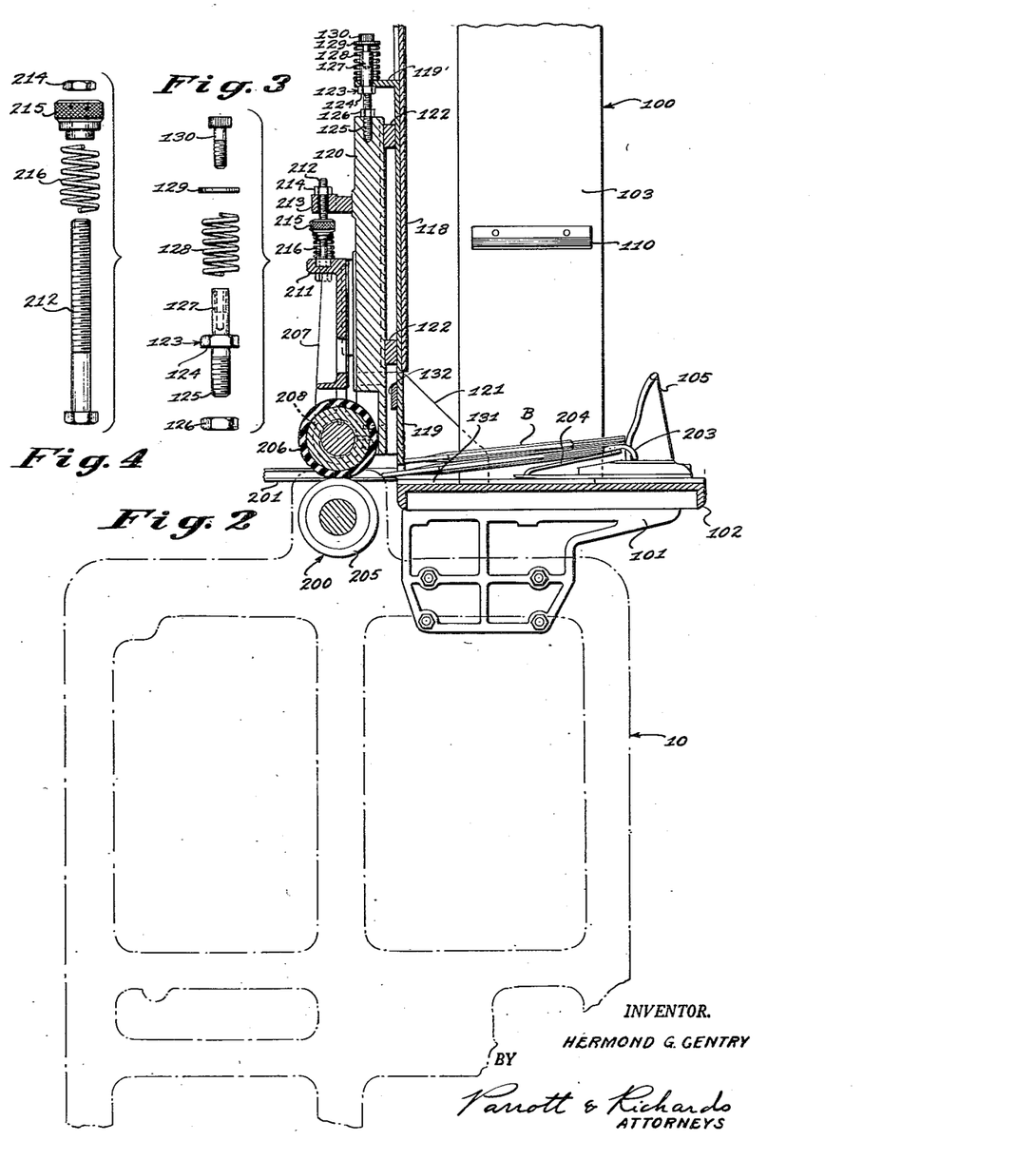
Fig. 2 is a fragmentary side elevation illustrating the arrangement of the hopper structure and feeding means associated therewith.
Fig. 3 is an exploded view of the elements employed for positioning and yieldably biasing the hopper gate.
Fig. 4 is an exploded view of the elements employed for positioning and yieldably biasing one of the feed rolls.
Figure 5:
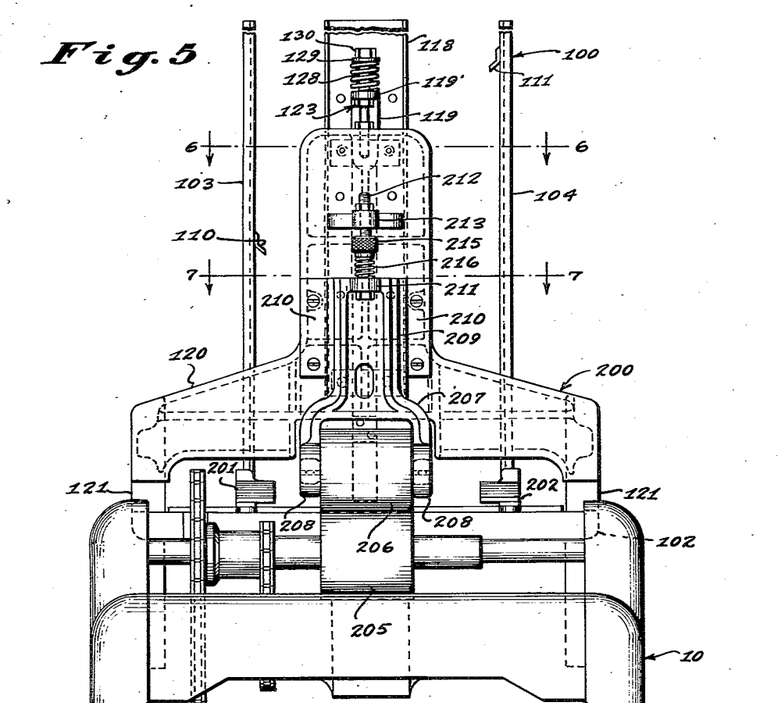
Fig. 5 is an elevation of the hopper gate and feed roll mounting arrangement as seen from the left in Fig. 2.
Figures 6, 7:
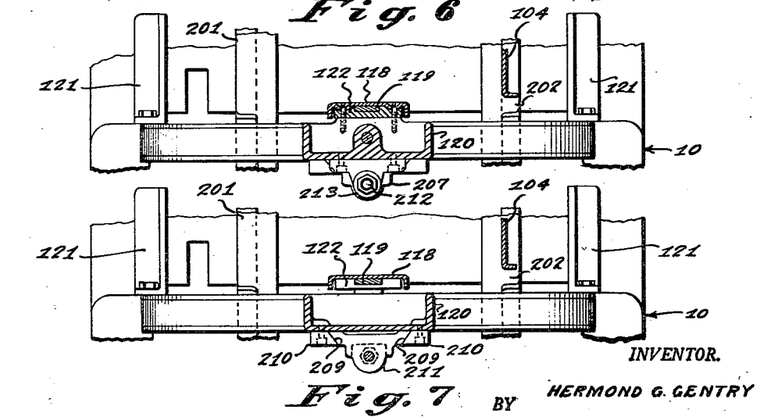
Fig. 6 is a section taken substantially on the line 6—6 in Fig. 5.
Fig. 7 is a section taken substantially on the line 7—7 in Fig. 5.

Fig. 2 shows the arrangement of the hopper structure 100 and feed means 200 more in detail in relation to an indication of the frame structure 10 in outline. The hopper structure 100 is attached to the frame structure 10 at mounting brackets 101 that support the hopper table 102 on which vertically disposed side plates 103 and 104 (compare Fig. 8), and a rear guide 105, are arranged to support laterally the stacked supply of bottle cartons B and to maintain the lowermost cartons B in a proper position for feeding.

Figure 8:
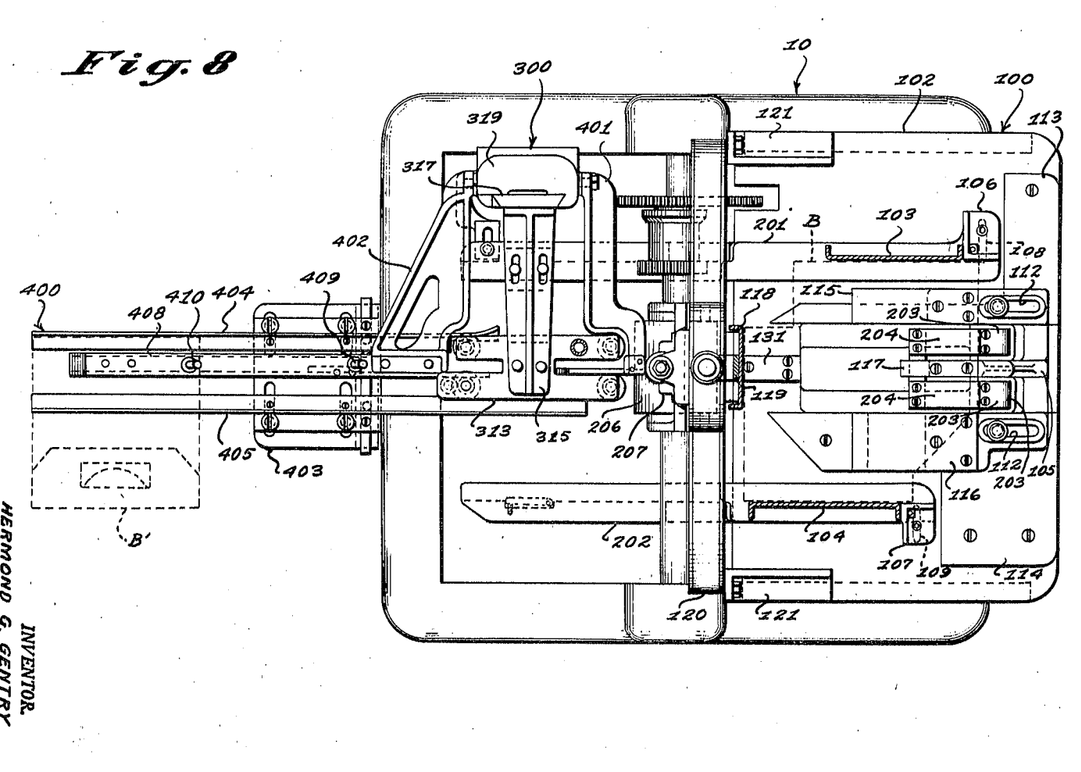
Fig. 8 is a plan view showing the related arrangement of the hopper structure, feeding means, setting up means, and guide means for receiving the bottle cartons as they are discharged after setting up.

The hopper side plates 103 and 104 are supported on brackets 106 and 107 that are secured on the hopper table 102 at elongated slots 108 and 109 so that they may be adjusted laterally to accommodate different sizes of bottle cartons B between the side plates 103 and 104. The support brackets 106 and 107 also have the adjacent ends of feed guides 201 and 202 inset and fixed at their bottom faces, so that these feed guides 201 and 202 are adjusted laterally with the hopper side plates 103 and 104. The hopper side plates 103 and 104 are further fitted with alternately spaced step bars or angle plates 110 and 111 to divide the load of the stacked supply of bottle cartons B and otherwise facilitate the handling of the cartons B in the hopper structure 100 as disclosed in the above noted copending application.

The rear guide bracket 105 is also arranged for adjustment to accommodate different sizes of bottle cartons B by means of elongated slots 112 formed therein to allow adjustment longitudinally of the hopper table 102. This rear guide bracket 105 is attached to and rests on top of hopper table plates 113 and 114, which plates 113 and 114 are attached at the top face of the hopper table 102 to provide in part a sliding surface for the bottle cartons B as they are stripped from the hopper structure 100.

The rear guide bracket 105 carries guide plates 115 and 116 arranged thereon with a downward inclination toward beveled lower ends that rest on the table plates 113 and 114 so as to guide the bottle cartons B smoothly onto the sliding surface of the table plates 113 and 114. The rear guide bracket 105 is also fitted with a spaced central guide plate 117 for further supporting the bottle cartons B as they are stripped from the hopper structure 100. Stripping of the lowermost bottle cartons B from the hopper structure 100 is effected by pusher fingers 203 arranged on either side of the central guide plate 117 at the spacing thereof from the guide plates 115 and 116 and upwardly biased on spring arms 204 so as to engage the rear edge of the lowermost bottle carton B in the hopper structure 100 at each feeding stroke when actuated with a reciprocating motion as disclosed in the above noted copending application.

As the lowermost bottle cartons B in the hopper structure 100 are stripped in the above indicated manner by the pusher fingers 203 they are moved forwardly in the feed guides 201 and 202 beneath a front hopper plate 118 at which a gate member 119 is disposed to allow stripping of only one bottle carton B at a time from the hopper structure 100. Both the front hopper plate 118 and the gate member 119 are carried on a support member 120 which is in turn attached to the hopper table 102 by means of mounting brackets 121. Provision is made for carrying the gate member 119 together with the front hopper plate 118 on the support member 120 by means of grooved screw blocks 122 which are arranged as spacers in attaching the front plate 118 to the support member 120 with the front plate 118 disposed in covering relation with respect to the grooves in the screw blocks 122 so that these grooves are adapted as slideways in which the gate member 119 is slidably disposed.

The upper end of the gate member 119 is angled laterally at 119' to overlie the support member 120 and a positioning stud 123 is adjustably arranged on the support member 120 to engage this laterally angled portion 119' as a bottoming abutment for the gate member 119. For this purpose, the positioning stud 123 is formed intermediately of its length with a hexagonal shoulder 124 below which a threaded shank 125 extends to engage the support member 120 with a lock nut arranged thereon so that the shank 125 can be locked in relation to the support member 120 at a desired adjusted position for the hexagonal stud shoulder 124.

The top face of this stud shoulder 124 serves as a bottoming surface for the laterally angled gate portion 119', and a smooth surfaced shank 127 extends upwardly from the shoulder 124 to pass through an aperture in the laterally angled gate portion 119' and to position a compression spring 128 arranged thereover above the angled gate portion 119' and held in place by a washer 129 and screw 130 to impose a downward bias on the gate member 119 so that it is normally maintained bottomed on the top face of the hexagonal positioning stud shoulder 124.

The lower end of the gate member 119 extends downwardly in spaced relation to a slide plate 131 fixed on the hopper table 102. By adjusting the hexagonal positioning stud shoulder 124 in relation to the support member 120, this lower end of the gate member 119 can be adjusted with respect to the hopper slide plate 131 so as to provide a spacing therebetween that is just sufficient to allow one bottle carton B at a time to be stripped from the hopper structure 100. However, as the gate member 119 is yieldably bottomed on the hexagonal positioning stud shoulder 124, it is free to give sufficiently to allow the bottle cartons B to pass readily as they are stripped, even though the aggregate thickness of the cartons B in their collapsed form may increase substantially rearwardly of the leading edges at which they must be selected for stripping. Also, the yieldably biased arrangement of the gate member 119 allows it to be manually lifted upward whenever necessary to relieve a jammed condition in the hopper structure 100; although to prevent removal of the gate member 119 in this way from its disposition in the screw block 122, a stop plate 132 is fixed adjacent the lower end of the gate member 119 to abut the lower screw block 122 and thereby limit upward movement of the gate member 119.

The feed means 200 by which the bottle cartons B are advanced from the hopper structure 100 to the set-up station includes a pair of feed rolls 205 and 206 arranged for gripping the bottle cartons B as they are stripped from the hopper structure 100 and feeding them forwardly toward the set-up station. The bottom feed roll 205 of this pair is journalled in fixed bearings on the frame structure 10 to be driven continuously as is explained further below, while the top feed roll 206 is disposed on the same previously noted support member 120 that carries the hopper gate 119.

To support the top feed roll 206, a yoke member 207 is provided that has journal bearings formed therein at 208 and that is formed with a rabbetted slide portion 209 that is disposed between gibs 210 attached to the adjacent face of the support member 120. The top roll yoke 207 is also formed with a lateral lug portion 211 that is apertured to allow extension of a tension screw 212 therefrom through an aligned aperture in an adjusting block 213, that is attached to the support member 120 in spaced relation above the lateral yoke lug 211, and that has the aperture therein threaded to engage the tension screw 212 and thereby hang the top roll yoke 207 at a desired spacing from the adjusting block 213, this spacing being determined by the engaged position of the tension screw 212 in the adjusting block 213.

A lock nut 214 is provided on the tension screw 212 above the adjusting block 213 to lock the screw 212 with respect to the block 213 at a given adjusted position, and a knurled bias adjusting nut 215 is arranged on the tension screw 212 between the adjusting block 213 and the lateral yoke lug 211 to bear against the upper end of a bias spring 216 that bears downwardly at its lower end against the top face of the lateral yoke lug 211 and thereby maintains the top roll yoke 206 hanging normally downward at the lowest possible position allowed by the tension screw 212. Accordingly, the tension screw 212 can be set with respect to the adjusting block 213 so that the top roll yoke 207 is slidably adjusted on the support member 120 for disposing the top roll 106 in proper feeding relation with respect to the bottom roll 205. However, the bias spring 216 yieldably disposes the yoke member 207 at this adjusted position for the top roll 206 and allows the yoke member 207 to rise and thereby back off the top roll 206 from the bottom roll 205 to accommodate readily any variation in aggregate thickness of a bottle carton B passing therethrough, while returning it immediately to the normal adjusted position thereof for effectively gripping the next succeeding carton B for feeding.

Figure 9:
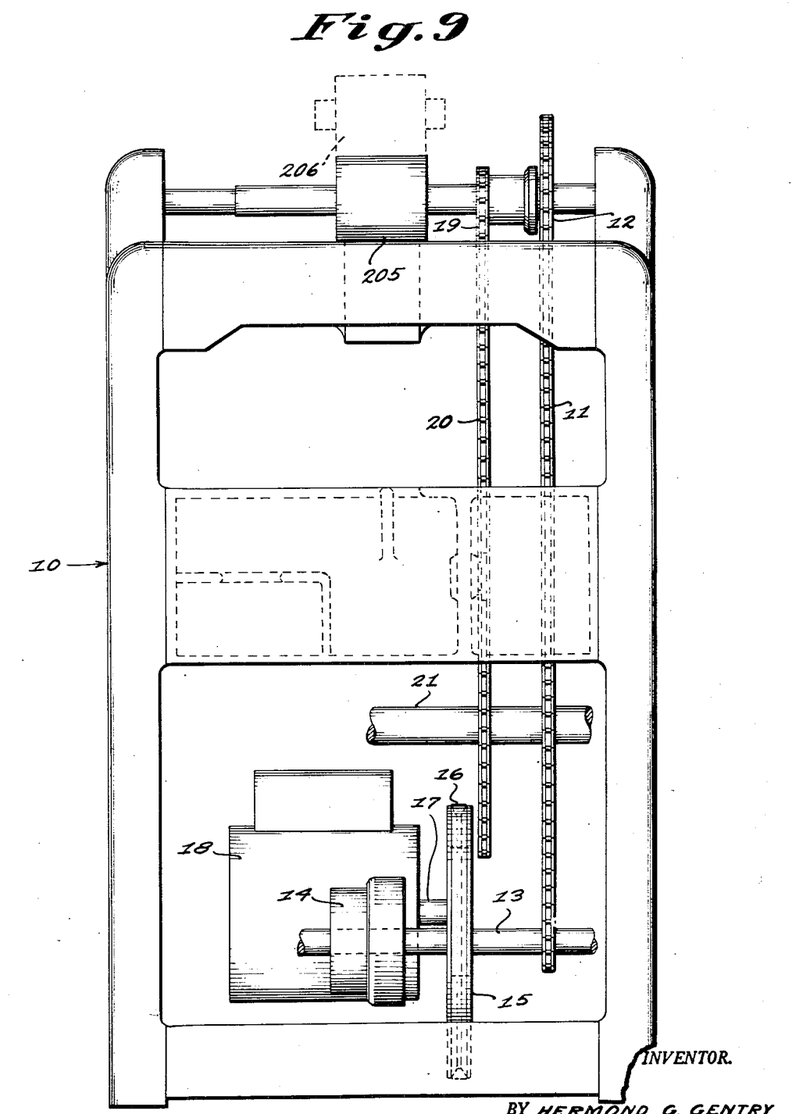
Fig. 9 is a schematic elevation illustrating the driving arrangement for the feeding means as seen from the end of the machine at the left in Fig. 8.
Figure 10:
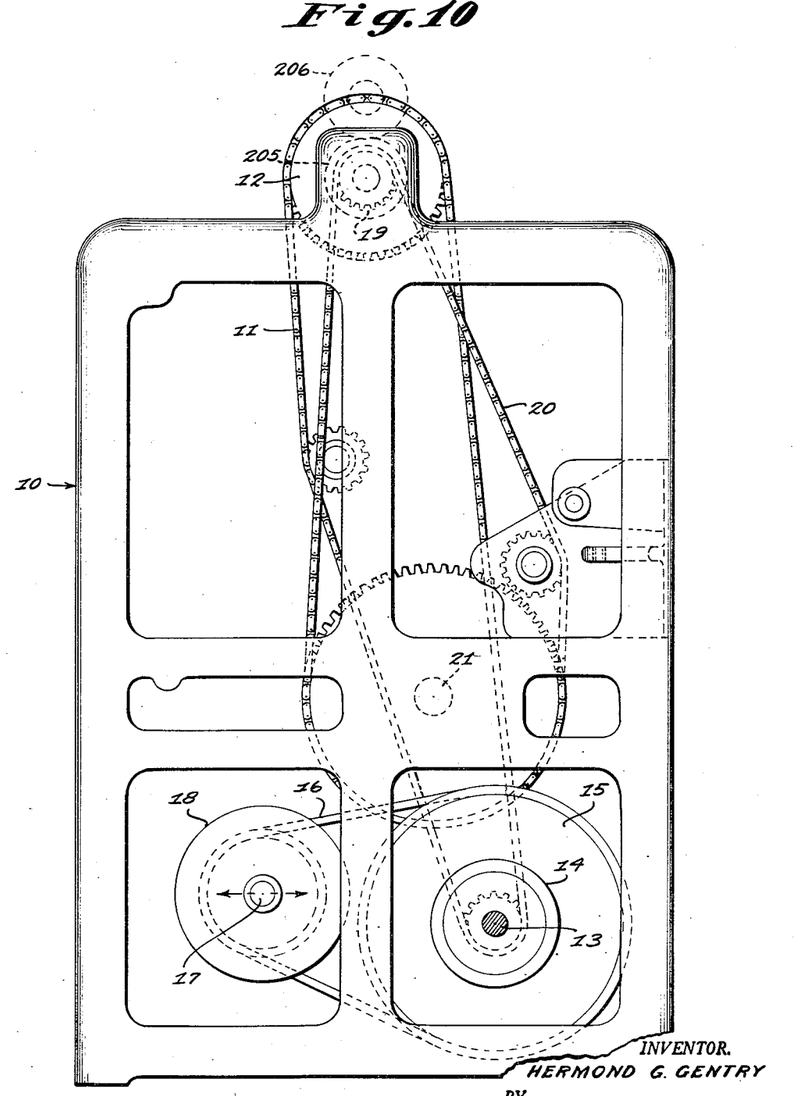
Fig. 10 is a schematic left side elevation corresponding to Fig. 9.

The arrangement for driving the bottom feed roll 205, as shown best in Figs. 9 and 10, comprises a sprocket chain connection 11 running to a sprocket wheel 12, carried on the mounting shaft for the feed roll 205, from a countershaft 13 on which an electric clutch 14 is arranged in relation to a variable speed pulley 15; the pulley 15 being freely rotatable on the countershaft 13 except when engaged by the electric clutch 14. The variable speed pulley 15 is coupled through a belt connection 16 to the pulley shaft 17 of a drive motor 18 that is mounted on the frame structure 10 for horizontal adjustment, as indicated in Fig. 10, in order to adjust the variable speed pulley 15 and thereby regulate the speed of the machine. By this arrangement, the bottom feed roll 205 is driven continuously as long as the electric clutch 14 is engaged.

Figure 11:
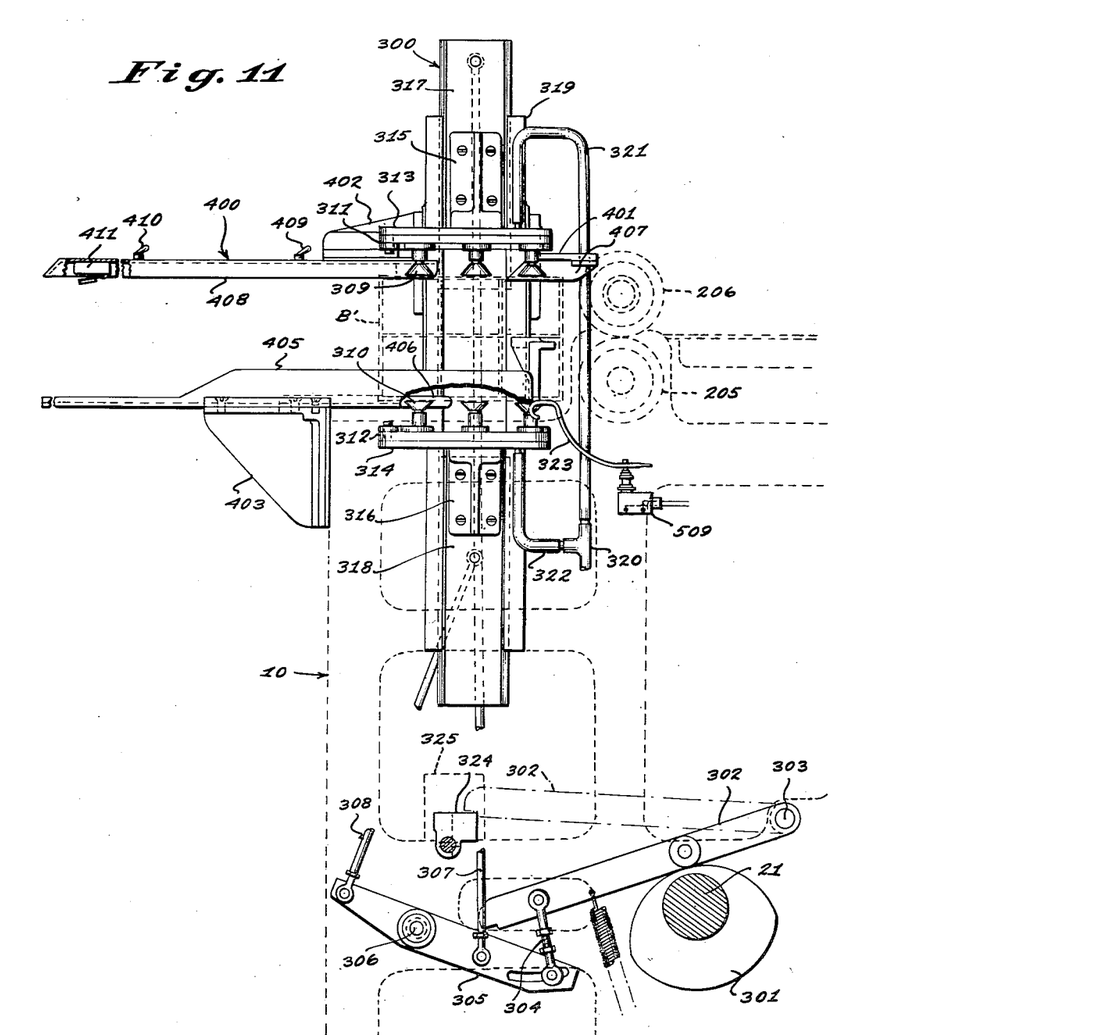
Fig. 11 is a further largely schematic left side elevation showing the general arrangement of the setting up means and the actuating mechanism therefor.

The mounting roll shaft for the bottom feed roll 205 also carries a second sprocket wheel 19 from which a further sprocket chain connection 20 runs to drive a cam shaft 21 from which the other operating elements of the machine are actuated substantially as disclosed in the above noted copending application. Fig. 11 illustrates the cam shaft actuated mechanism for the setting up means 300 by which the collapsed bottle cartons B are erected after feeding to the set-up situation. This mechanism comprises an operating cam 301 arranged on the cam shaft 21 in relation to a follower arm 302 that is pivoted at one end 303 on the frame structure 10 and is connected adjacent its other end through a link 304 to a rock arm 305. The rock arm 305 is pivoted at 306 on the frame structure 10 intermediately of its length and carries operating rods 307 and 308 at either side of its pivot 306 for actuating the carton erecting motion of the setting up means 300.

The setting up means 300 proper is characterized by opposed upper and lower groups of suction cups 309 and 310 by which a collapsed carton B at the set-up station may be gripped so as to open it to erect position. The groups of upper and lower suction cups 309 and 310 are mounted in manifold blocks 311 and 312, each of which is fitted with cover plates 313 and 314, and with which they are attached to mounting brackets 315 and 316. These mounting brackets extend from upper and lower slide members 317 and 318 that are arranged in a common guideway member 319, and to which the previously mentioned operating rods 307 and 308 are connected so that motion of the rock arm 305 results in closing and opening movement of the opposed groups of suction cups 309 and 310 for gripping and erecting the bottle cartons B.

Conduit connections for impressing a suction on the suction cup groups 309 and 310 are provided from a T fitting 320 at which flexible hose connections 321 and 322 branch to the manifold cover plates 313 and 314, the remaining leg of the T fitting 320 being connected to a suitable vacuum system (not shown) as disclosed in the above noted copending application. It will also be noticed that a feeler arm 323 is arranged at the set-up station to sense the bottle cartons B after erection thereat, and that a solenoid operated keeper 324 is arranged in relation to the extending end of the operating follower arm 302 to lock it against following the operating cam 301; the solenoid being indicated in Fig. 11 at 325, and the keeper 324 being positioned laterally by the solenoid 325 to engage or disengage the follower arm 302. Both the feeler 323 and the solenoid 325 operating the keeper 324 form parts of the electrical control circuit 500 as is explained further below.

Figure 12:
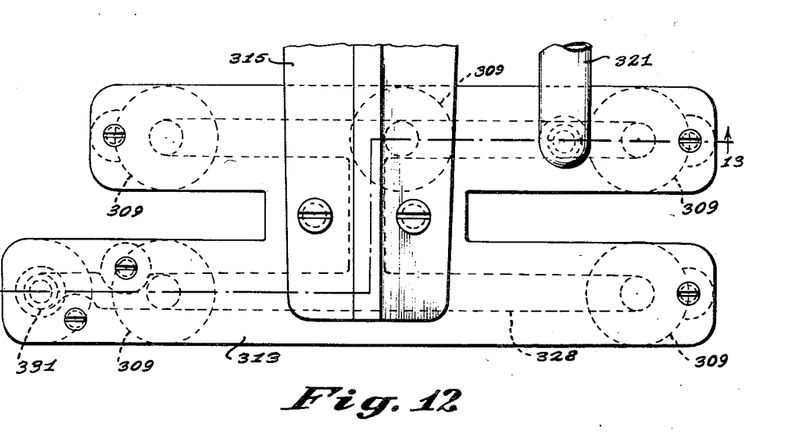
Fig. 12 is a plan detail of the upper suction manifold for the setting up means.
Figure 13:
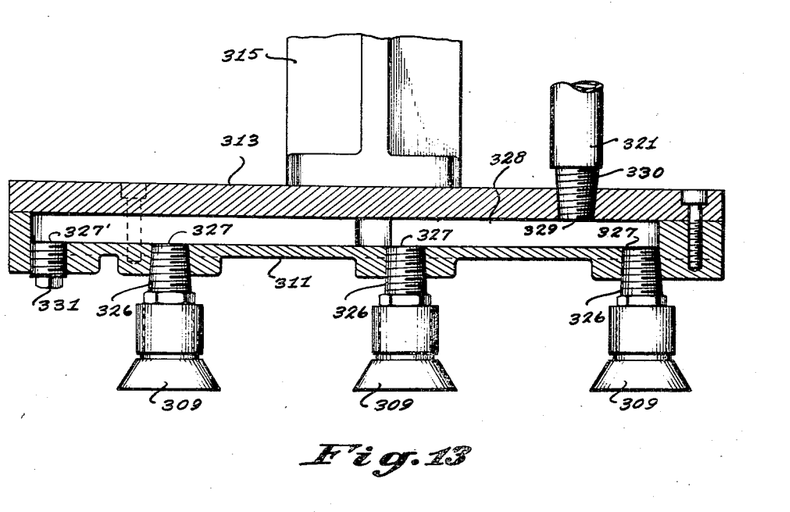
Fig. 13 is a section taken substantially at the line 13—13 in Fig. 12.

The mounting arrangement for the suction cups of the setting up means 300 is illustrated further in Figs. 12 and 13, in which the upper group of suction cups 309, together with the manifold block 311 and cover plate 313 therefor are shown; the arrangement for the lower group of suction cups 310, and manifold block 312 and cover plate 314 therefor, being exactly the same except for reversal in opposed relation. As shown in Figs. 12 and 13, the suction cups 309 are fitted with nipples 326 by which they are attached to the manifold block 311 at mounting ports 327 that are threaded to receive these nipples 326. The mounting ports 327 extend from the face of the manifold block 311 at which the suction cups 309 are disposed into a common manifold channel 328 formed at the opposite face of the manifold block 311 and closed by the cover plate 313, except for a connection port 329 therein threaded to receive a nipple fitting 330 for the flexible hose 321 from the vacuum system. It should also be noted that the manifold block 311 is formed with at least one additional mounting port 327' in excess of the number of suction cups 309 provided, and that this additional mounting port 327' is formed in all respects like the other ports 327, but is fitted with a plug member 331 closing it off as seen in Fig. 13. By this arrangement, the spacing of the suction cups 309 is made variable, for the plug member 331 may be interchanged with the nipple fittings 326 of any of the suction cups 309 to rearrange one of these cups 309 at the additional mounting port 327' and thereby provide for better handling of different sizes of bottle cartons B.

The discharge guide means 400 provided for receiving the erected bottle cartons B' as they are discharged from the set-up station comprises a plurality of cooperating guide members carried by mounting brackets 401 and 402 attached to the guideway member 319 of the setting up means 300, and by a further mounting bracket 403 attached to the frame structure 10. The mounting bracket 403 carries the lower discharge guides which comprise right and left lower guides 404 and 405, both of which are laterally adjustable to the size of the erected bottle cartons B' being discharged, and a center discharge guide 406. The center guide 406 is provided to insure disengagement of the bottle cartons after setting up from the lower group of suction cups 310 and, for this purpose, extends between the adjacent suction cups of the group 310 at a level just above their furtherest downward travel. Similarly, the mounting bracket 401 on the set-up station guideway 319 carries an upper center guide 407 disposed for the same purpose in relation to the upper suction cup group 310.

The other mounting bracket 402 on the guideway 319 carries a center discharge guide 408 extending in comparable length with the lower right and left guides 404 and 405. This upper center discharge guide 408 is fitted with a control switch 409 by which the electric clutch 14 can be connected or disconnected to set the machine for operation or for idling as desired, and with a selector's switch 410 and microswitch feeler 411 through which the machine may be set for continuous or intermittent operation as explained below in connection with the electrical control circuit illustrated in Fig. 14.

Figure 14:
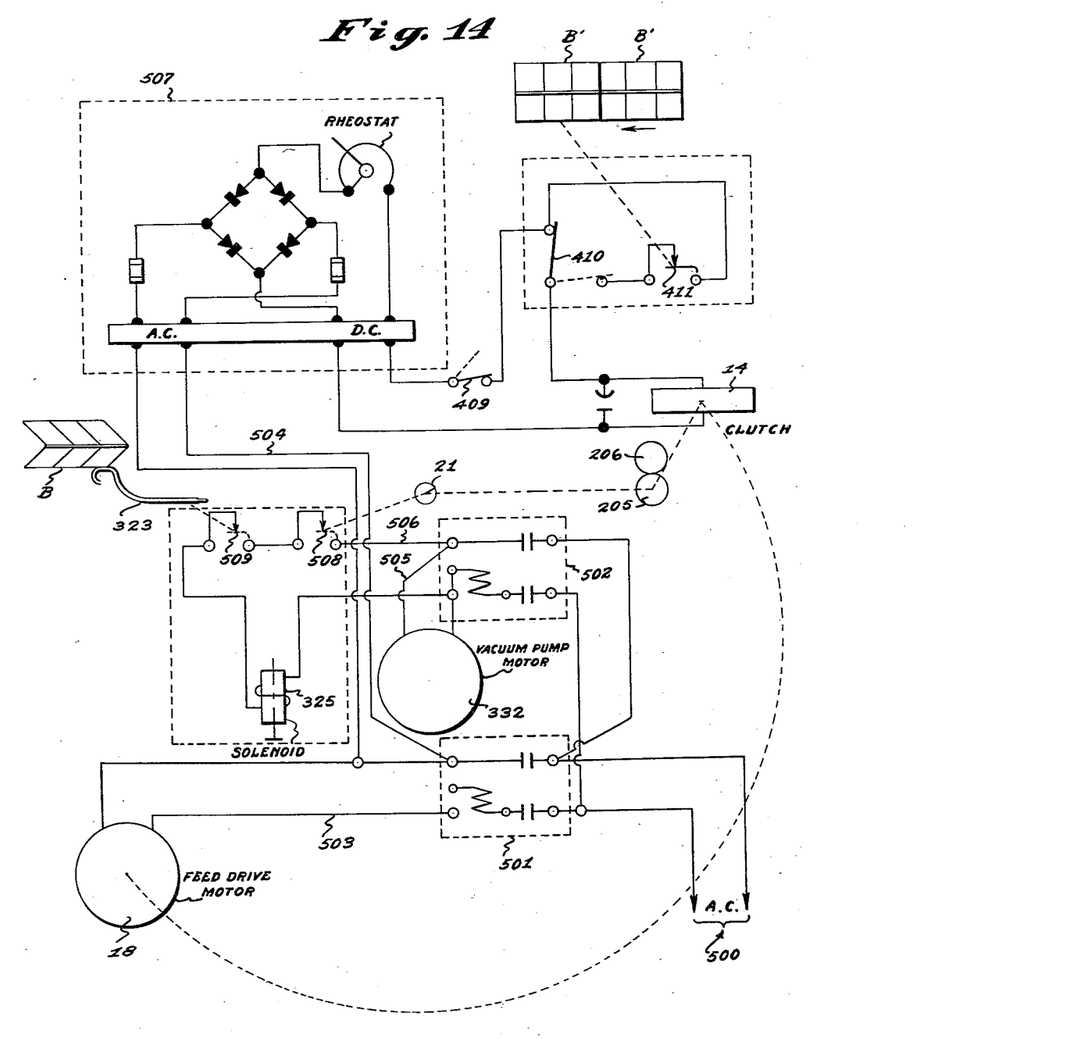
Fig. 14 is a schematic diagram of the electrical control circuit.

As shown in Fig. 14, the electrical control circuit comprises a line connect 500 as previously indicated in Fig. 1 with power switches 501 and 502 arranged in parallel across the line connection 500. The power switch 501 controls a circuit 503 connected for operation of the drive motor 18 and a second parallel circuit 504 for the electric clutch 14. The power switch 502 in turn controls a circuit 505 connected to operate a suitable vacuum pump motor 332 for supplying suction at the setting up means 300, and a second parallel circuit 506 connected to control operation of the setting up means 300 through the solenoid 325, as previously mentioned.

The first circuit 503 from the power switch 501 is connected directly to the drive motor 18, so that the motor 18 runs continuously as long as the power switch 501 is closed. The parallel circuit 504 from the power switch 501 includes a conversion unit as indicated at 507 for operating the electric clutch 14. Beyond this conversion unit 507 the previously mentioned control switch 409 and selector switch 410 that are arranged on the upper discharge guide 408 are connected in series with the clutch 14. The control switch 409 is a single pole, single throw switch at which the power source for the electric clutch 14 may be connected or disconnected as desired. When this control switch 409 is disconnected, the machine cannot be operated, because there will then be no power for causing the electric clutch 14 to connect the variable speed pulley 15 for driving the countershaft 13, even through the drive motor 18 continues to operate.

With the control switch 409 closed, however, power will be supplied to the electric clutch 14 through the selector switch 410 which is a single pole double throw switch arranged to connect the clutch 14 directly to its power source when in the full line position shown in Fig. 14, and thereby maintain the clutch 14 connected for continuous operation of the machine; or to connect clutch 14 indirectly through the microswitch feeler 411 (provided in the upper discharge guide 408) when at the dotted line position shown in Fig. 14, so as to provide for intermittent operation of the electric clutch 14 as determined by the presence of erected bottle cartons B' on the discharge means 400. This intermittent operating control of the machine is obtained by arranging the microswitch 411 to be normally closed and disposing it on the discharge guide 408 so that whenever a desired number of erected cartons B' are present on the discharge means 400 the leading discharge carton B' of this desired number will operate to trip the microswitch 411 to an open position and thereby disconnect the power to the clutch 14 so that operation of the machine will be interrupted until the leading erected carton B' has been removed from the discharge means 400 to make room for a succeeding one.

The vacuum pump motor 332 is connected directly by the circuit 505 from the power switch 502 so that it runs continuously, like the drive motor 18, as long as the power switch 502 is closed, the vacuum system (not shown) being operated from the cam shaft 21 for applying and releasing suction during operation of the setting up means 300 as disclosed in the above noted copending application.

The parallel circuit from the power switch 502 provided for the solenoid control 325 includes two normally open microswitches 508 and 509 connected in series with the solenoid 325. The first of these microswitches 508 is mechanically connected for periodically closing during each revolution of the cam shaft 21 at a timing just in advance of the operation of the cam shaft 21 through the operating cam 301 to close the opposed groups of suction cups 301 and 310 for gripping a collapsed bottle carton B fed to the set-up station. For this purpose, a special actuating cam (not shown) may be provided on the cam shaft 21, or the microswitch 508 may be actuated from one of the other operating cams on the cam shaft 21 as disclosed in the above noted copending application.

The second series connected microswitch 509 is mechanically connected with the previously mentioned feeler arm 323 disposed at the set-up station for sensing the presence of an erected carton B' thereat, so that this microswitch 509 will be closed and maintained closed as long as such an erected carton B' is present at the set-up station. During normal operation such an erected carton B' will be discharged onto the discharge guide means 400 by the next succeeding collapsed bottle carton B fed to the set-up station for erection. If for any reason this feeding operation is not completed, however, the feeding failure will be signalled by the closed microswitch 509 at the same time that the first, series-connected, microswitch 508 is closed through operation of the cam shaft 21, and with both microswitches 508 and 509 closed the circuit 506 will be completed through the solenoid 325 to actuate the keeper 324 for locking the follower arm 302 and thereby rendering the setting up means inactive until the feeding difficulty can be corrected and normal operation resumed.

The present invention has been described in detail above for purposes of illustration only and is not intended to be limited by this description or otherwise except as defined in the appended claims.

I claim:

1. In a machine for setting up collapsible bottle cartons in which a hopper structure is provided to contain a stacked supply of said bottle cartons in collapsed form, together with means for partially stripping successively from said stacked supply the lowermost bottle carton and means, including a pair of feed rolls, for gripping and feeding said partially stripped bottle cartons successively from said hopper structure, and in which the bottle cartons of said stacked supply increase substantially in aggregate thickness rearwardly of the carton edge that leads during stripping and feeding of said cartons from said hopper structure, a stationary hopper table forming the bottom of said hopper structure, a support member fixed on said hopper table at the side of said hopper structure from which said bottle cartons are stripped, a gate member slidably disposed on said support member and yieldably biased downwardly thereon to a position closing said hopper structure side except for clearance to allow stripping of said lowermost bottle cartons between the lower edge of said gate member and the top of said hopper table, said gate member being adjustable on said support member against the yieldable bias thereon to set said clearance initially, one of said pair of feed rolls being a lower roll mounted in fixed relation with respect to said hopper table for forming a feed nip positioned to receive the leading edge of said bottle cartons as they are partially stripped from said hopper structure, and the other of said paired feed rolls being a top roll slidably disposed on said support member and yieldably biased thereon to a position opposing said first mentioned feed roll in feed nip relation, said other feed roll also being adjustable on said support member against the yieldable bias thereon to set the initial feed nip relation, whereby said gate member and said feed rolls may both be set initially for effectively handling said bottle cartons successively while remaining yieldable to accommodate said substantial increase in the aggregate thickness of the bottle cartons rearwardly of said leading edge during stripping and feeding of said cartons.

2. In a machine of the character defined in claim 1, the structure so defined and further characterized in that said gate member is arranged to bear yieldably downward on a positioning stud adjustably carried on said support member for rendering said gate member adjustable to set said clearance initially.

3. In a machine of the character defined in claim 2, the structure so defined and further characterized in that said positioning stud is formed with a shank portion extending upwardly therefrom above said gate member and having resilient means contained thereon for biasing said gate member downwardly.

4. In a machine of the character defined in claim 1, the structure so defined and further characterized in that said other feed roll is arranged to hang yieldably downward on a tension screw carried on said support member for adjustment to render said other feed roll adjustable to set said initial feed nip relation.

5. In a machine of the character defined in claim 4, the structure so defined and further characterized in that said tension screw carries a spring contained thereon in biasing relation with respect to said other feed roll by an adjusting nut rendering the feed roll bias adjustable independently of the setting of said initial feed nip relation.

References Cited in the file of this patent

UNITED STATES PATENTS

| Number | Name | Date |
|---|---|---|
| 1,180,040 | Holly | Apr. 18, 1916 |
| 1,236,054 | Clark | Aug. 7, 1917 |
| 1,584,807 | Roberts | May 18, 1926 |
| 1,765,416 | La Bombard | June 24, 1930 |
| 1,954,908 | Zimniak | Apr. 17, 1934 |
| 2,042,719 | Lindgren | June 2, 1936 |
| 2,256,244 | Fitchett | Sept. 16, 1941 |
| 2,280,773 | Ferguson | Apr. 28, 1942 |
| 2,375,296 | Ford | May 8, 1945 |
| 2,583,713 | Shields | Jan. 29, 1952 |
| 2,632,644 | Wockenfuss | Mar. 24, 1953 |
| 2,704,208 | Rockstrom | Mar. 15, 1955 |